Oct. 7, 1924.
F. D. CHAPMAN
CONTINUOUS COOKER
Filed March 5, 1923
1,510,544
3 Sheets-Sheet 1
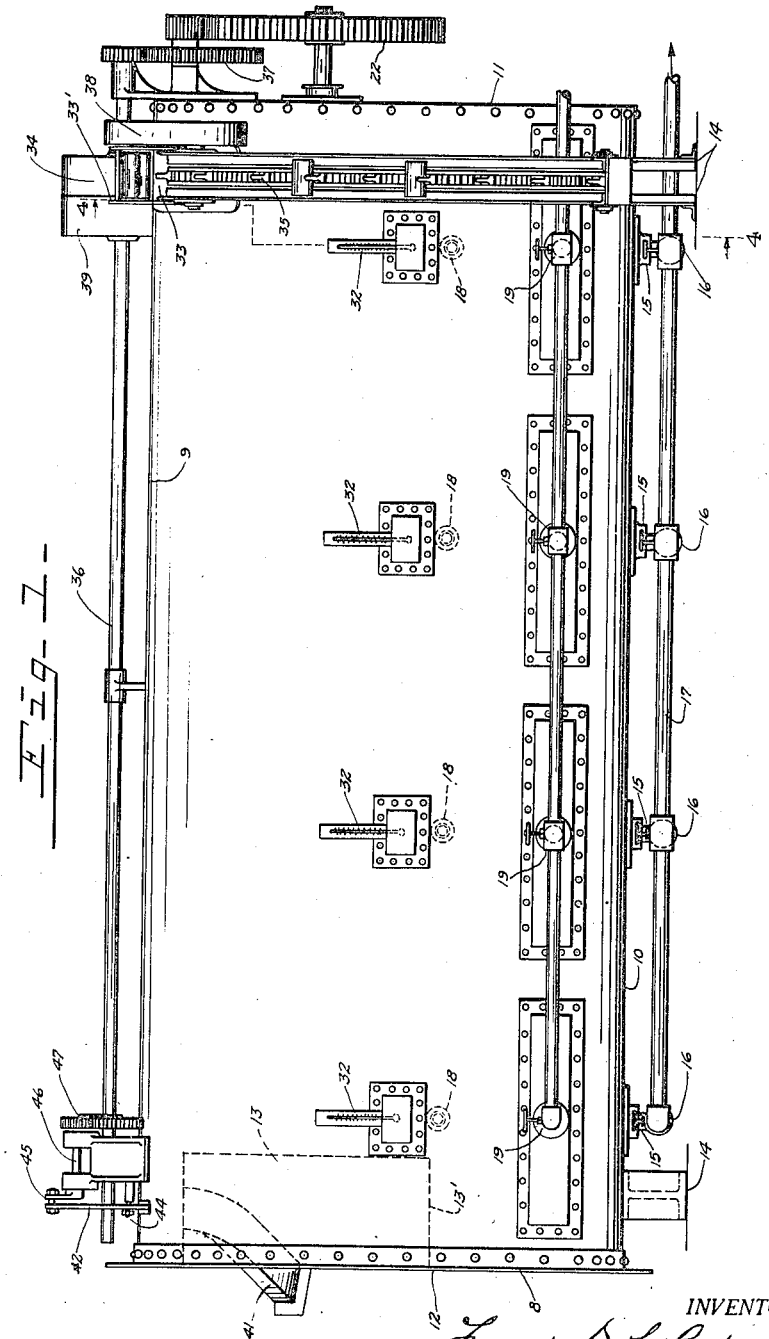
INVENTOR.
Frank D. Chapman.
BY
Morsell, Keeney & Morsell.
ATTORNEYS.

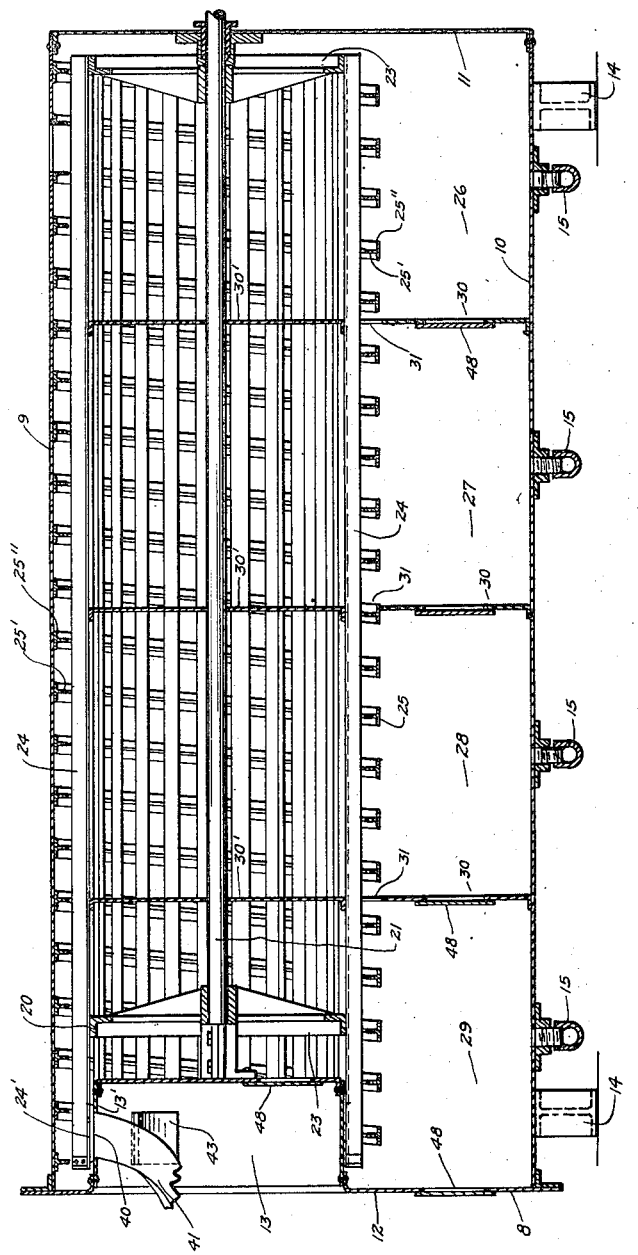

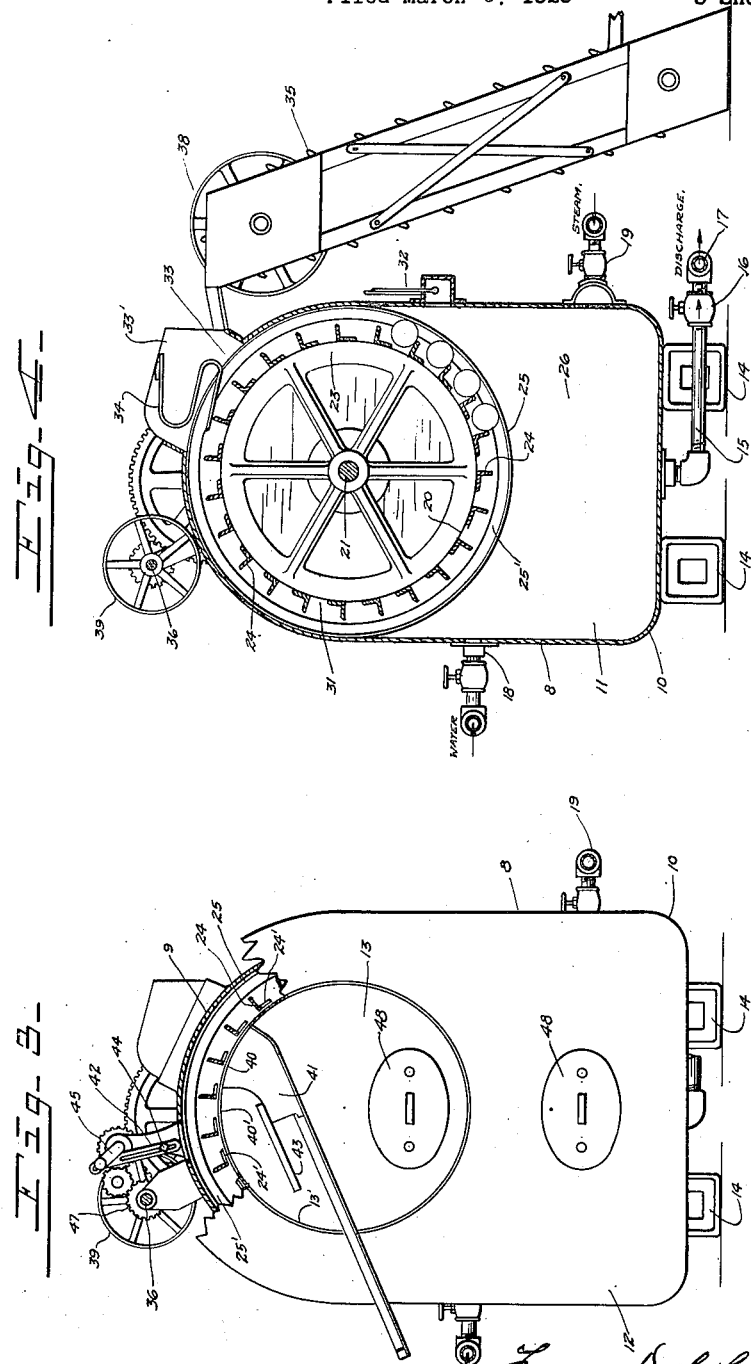

Patented Oct. 7, 1924.

1,510,544

UNITED STATES PATENT OFFICE.

FRANK D. CHAPMAN, OF BERLIN, WISCONSIN.

CONTINUOUS COOKER.

Application filed March 5, 1923. Serial No. 623,046.

*To all whom it may concern:*

Be it known that I, FRANK D. CHAPMAN, a citizen of the United States, and resident of Berlin, Wisconsin, in the county of Green Lake and State of Wisconsin, have invented new and useful Improvements in Continuous Cookers, of which the following is a description, reference being had to the accompanying drawings, which are a part of this specification.

This invention relates to improvements in continuous cookers more particularly adapted for cooking or heating canned goods.

It is one of the objects of the present invention to provide a continuous cooker having a plurality of compartments through which food in cans may be fed and discharged continuously.

A further object of the invention is to provide a continuous cooker in which variations in degree of cooking may be made without variations in the length of time the canned food passes through the cooker.

A further object of the invention is to provide a continuous cooker having a plurality of compartments or zones which may be independently maintained at various temperatures to permit control of time period in which the temperature of the food may be brought up to cooking degree and then cooled to the discharging degree desired.

A further object of the invention is to provide a continuous cooker having a revoluble reel for moving the food containing cans through the compartments of the cooker and discharging said cans through an opening in a recessed end of the cooker.

A further object of the invention is to provide a continuous cooker having means for removing defective food cans from the line of good cans.

A further object of the invention is to provide a continuous cooker having a plurality of compartments of sufficient size to maintain predetermined temperatures in which the water thereof may be heated to different temperatures and controlled within practical limits for cooking different foods.

A further object of the invention is to provide a continuous cooker divided into a plurality of compartments, and in which a single conveyor extends through all of the compartments and is also divided into compartments corresponding with the compartments of the cooker.

A further object of the invention is to provide a continuous cooker having exterior means for indicating the temperature in the different compartments.

A further object of the invention is to provide a continuous cooker which is of simple construction, is strong and durable and is well adapted for the purpose described.

With the above and other objects in view the invention consists of the improved continuous cooker and its parts and combinations as set forth in the claims, and all equivalents thereof.

In the accompanying drawings in which the same reference characters indicate the same parts in all of the views:

Fig. 1 is a side view of the improved continuous cooker;

Fig. 2 is a vertical longitudinal sectional view thereof;

Fig. 3 is a view of the discharging end of the cooker, a part being broken away to show interior construction; and Fig. 4 is a transverse sectional view taken on line 4—4 of Fig. 1.

Referring to the drawing the numeral 8 indicates a horizontally extending tank, which in cross section has a semicircular upper portion 9 and a rectangular lower portion 10 with rounded corners. The receiving or charging end of the tank is closed by a flat head 11 and the discharging end is closed by a head 12 having a deeply recessed portion 13 into which the food cans are discharged. Legs 14 support the tank a slight distance above the floor to accommodate discharge pipes 15 connected to the bottom portion of the tank. Valves 16 connected to said pipes 15 control the discharge therethrough and connect said pipes to a discharge pipe 17 common to all of said pipes. Valved pipes 18 supply water to said tank while valved pipes 19 supply steam or other heating medium to said tank. A rotary carrier 20 positioned in the upper portion of the tank and concentric to the upper rounded portion thereof is mounted upon a shaft 21 which extends through the charging end of the tank and has a gear 22 on its outer end. The rotary carrier comprises two spoked heads or spiders 23 mounted on the shaft at opposite ends of the tank and joined together by longitudinally extending angle bars 24 which have one of their angled portions extending radially and the other circumferentially. Said bars extend in parallel relation to the shaft and are of less distance apart than the diameter of the food cans so that said cans cannot pass therebetween. The bars 24 coact with a spirally trending guiding track member 25 which is positioned within the tank and surrounds the carrier and is supported from the upper rounded portion of the tank. The said guiding member is formed of metal of T-shape in cross section with the stem portion 25' of the T extending radially inwardly to form a continuous end guide for the cans, while the outer cross portions 25" form guides for the side edge portions of the cans. The convolutions of the spiral member are spaced apart a sufficient distance to permit a can to roll on the cross portions and between the stem portions while being moved by the carrier and advanced by the spiral member.

The tank is divided into a plurality of compartments 26, 27, 28 and 29 by partitions 30 which extend from the bottom portion of the tank upwardly to the spiral track member 25, and within the carrier the partitions are respectively continued in the form of disk partitions 30' carried by the carrier, so that only a ringlike space 31 is open between the compartments to permit the passage of the cans therethrough. The several compartments are adapted to be filled with water through the pipes 18, and by means of the admission of steam through the pipes 19 the water in the different compartments may be maintained at any temperature desired, so that in cooking the food in the cans the first compartment water may be moderately warm, the second hot, the third still hotter and the fourth cooler to reduce the temperature of the cans before discharging them from the tank. By thus varying the temperature of the water in the different compartments the food may be cooked to a predetermined greater or less degree without changing the time period of the travel of the cans through the tank. By having the lower portions of the tank of comparatively large size, sufficient water is held to maintain predetermined temperatures, which would not be the case with a less amount of water due to the fact that the cans are constantly extracting heat from each compartment. This construction also permits food of different kinds requiring different periods of time in cooking, preliminary warming or cooling after cooking to be easily taken care of in the improved continuous cooker.

Thermometers 32 projecting outwardly from each compartment provide for outward indications of the temperatures within the respective compartments.

The charging end at one side of the tank is provided with a charging opening 33 formed with side guide wings 33' and an S-shaped spring member 34. An endless elevator 35 adjacent the charging opening is arranged to feed cans through said opening 33 to the rotary carrier 20 within the tank. The cans in passing from the elevator to the carrier are engaged by the spring 34 and yieldingly forced into position between the convolutions of the spiral guide 25 and the carrier bars 24.

A drive shaft 36 journaled on the upper portion of the tank has a gear drive connection 37 with the gear 22 and a belted connection 38 with the conveyer 35. Belt wheels 39 mounted on the drive shaft 36 are adapted to be connected to a source of power.

The deeply recessed discharge end portion 13 of the tank is of circular formation and extends inwardly between rear projecting ends of the bars 24 and concentric with relation to the rotary carrier 20. The upper annular part of the discharge end is formed with an elongated discharge opening 40 which extends circumferentially in alinement with the space between the end convolutions of the spiral 25. The rear end inner angled portions of the longitudinal bars 24 are cut away as indicated by the numeral 24' to permit the cans to drop therethrough when said portions are in register with the opening 40, the annular portion 13' of the recessed end supporting said cans until the cans reach the opening 40. A trough guide 41 connected to the annular portion 13' and in register with a portion of the opening 40 extends outwardly and downwardly at an angle therefrom and is adapted to direct all perfect cans to a point of disposition. At times some cans in passing through the cooker burst from pressure developed in the can or otherwise become damaged and distorted with the result that they will not pass through the space between the bars 24 or the discharge opening 40, with the result that unless a means is provided for discharging the damaged cans the cooker will become clogged and serious damage result. To overcome this objectionable feature a discharging plunger 42 is provided which is adapted to force defective cans through the remaining portion 40' of the opening 40 and said defective cans will drop on the guide 43 and be directed away from the perfect cans. The plunger 42 is of slotted formation and a bolt 44 extending through the slot guides the same, while the upper end of the plunger is pivotally connected to and reciprocated by a crank arm 45 which is mounted on a short shaft 46. Said shaft has a geared connection 47 with the main drive shaft 36 and is driven thereby, and the parts are so timed as to have the plunger move downwardly between each pair of bars when in register therewith.

Covered manholes 48 are provided in the tank and partitions to permit access to the tank and different compartments.

From the foregoing description it will be seen that the cans are fed into one end of the tank in a continuous stream and likewise discharged from the other end, and while passing through the tank the food within the cans may be subjected to zones of various degrees of heat without changing the speed of travel of the cans, thus providing for cooking different kinds of food requiring different heat treatments.

What I claim as my invention is:

1. A continuous cooker, comprising a horizontally extending tank having inlet and outlet openings and zones of various degrees of heat, a single spirally trending member extending through said heat zones, and a single rotary carrier extending through the spirally trending member and coacting therewith for moving cans and having means forming part of and moving with the carrier for preserving the heat zones.

2. A continuous cooker, comprising a tank member having an inlet and an outlet opening and a plurality of compartments for maintaining heat at various temperatures in each compartment, and a rotary carrier within the tank and extending through the compartments for moving cans from one end of the tank to the other and extracting heat from said compartments and aiding in preserving the differences in temperatures in said compartments, said rotary carrier having partitions forming part of and moving with the carrier which coincide with the tank partitions to maintain predetermined degrees of heat in each compartment.

3. A continuous cooker, comprising a horizontally extending tank having inlet and outlet openings and zones of various degrees of heat for cooking food in cans passed therethrough, means controlling the temperature of said zones, a spirally trending member extending through said heat zones, and a rotary carrier extending through the spirally trending member and coacting therewith for moving cans from the inlet opening through the heat zones and to the outlet opening and having means forming part of and moving with the carrier for preserving the heat zones.

4. A continuous cooker, comprising a horizontally extending tank having inlet and outlet openings and transverse partitions to form zones of various degrees of heat for cooking food in cans passed therethrough, means controlling the temperature of said zones, a spirally trending member extending through said heat zones, and a rotary carrier extending through the spirally trending member and the heat zones and coacting with said spirally trending member for moving cans from the inlet opening through the heat zones and to the outlet opening, said rotary carrier having transverse partitions which coincide with the tank partitions for preserving the heat zones.

5. A continuous cooker, comprising a horizontally extending tank having an inlet opening adjacent one end and a recessed opposite end provided with an outlet opening, said tank also having zones of various degrees of heat, means for controlling the temperature of said zones, a spirally trending member extending through said heat zones and surrounding the recessed end of the tank, and a rotary carrier extending through the spirally trending member and the heat zones and having discharge portions which extend around the recessed end of the tank, said rotary carrier coacting with the spirally trending member in moving cans from the inlet opening through the heat zones and to the recessed end outlet opening, said rotary carrier having means coacting with the tank heat zones for preserving the heat zones.

6. A continuous cooker, comprising a horizontally extending tank having an inlet opening adjacent one end and a rounded recessed opposite end provided with an outlet opening in its peripheral portion, said tank also having transverse partitions for dividing the tank into compartment zones of various degrees of heat, means for controlling the temperature of said zones, a spirally trending member extending through said heat zones and surrounding the recessed end portion of the tank, a rotary carrier extending through the spirally trending member and the heat zones and having discharge portions which extend around the recessed end of the tank, said rotary carrier coacting with the spirally trending member in moving cans from the inlet opening through the heat zones and to the recessed end outlet opening, said rotary carrier having transverse partitions which coact with the tank partitions for preserving the heat zones, means for feeding cans to the inlet opening, and means for removing cans from the discharge opening.

7. A continuous cooker, comprising a horizontally extending tank having a side inlet adjacent one end and a rounded recessed opposite end provided with an outlet opening in its upper peripheral portion, said tank also having transverse partitions for dividing the tank into water compartment zones of various degrees of heat, means for controlling the temperature of the water in said zone compartments, a flanged spirally trending member extending through said heat zones and surrounding the recessed end portion of the tank, a rotary carrier extending longitudinally through the spirally trending member and the heat zones and provided with parallel longitudinally extending bars of angular form in cross section and between which the cans are maintained and slide in moving through the heat zones, end portions of said bars extending closely around the recessed portion of the discharge end of the tank and being formed to permit the cans to pass therebetween when in register with the peripheral discharge opening, said rotary carrier having transverse partitions which coact with the tank partitions for preserving the heat zones, means for feeding cans to the inlet opening, and means for removing cans from the discharge opening.

8. A continuous cooker, comprising a horizontally extending tank having a side inlet adjacent one end and a rounded recessed opposite end provided with an outlet opening in its upper peripheral portion, said tank also having transverse partitions for dividing the tank into water compartment zones of various degrees of heat, water supply and discharge pipes connected to the different zone compartments, steam inlet pipe means for controlling the temperature of the water in said zone compartments, a flanged spirally trending member extending through said heat zones and surrounding the recessed end portion of the tank, a rotary carrier extending longitudinally through the spirally trending member and the heat zones and provided with parallel longitudinally extending bars of angular form in cross section and between which the cans are maintained and slide in moving through the heat zones, end portions of said bars extending closely around the recessed portion of the discharge end of the tank and being formed to permit the cans to pass therebetween when in register with the peripheral discharge opening, said rotary carrier having transverse partitions which coact with the tank partitions for preserving the heat zones, means for feeding cans to the inlet opening, and means for removing cans from the discharge opening.

9. A continuous cooker, comprising a horizontally extending tank having a side inlet adjacent one end and a rounded recessed opposite end provided with an outlet opening in its upper peripheral portion, said tank also having transverse partitions for dividing the tank into water compartment zones of various degrees of heat, means for controlling the temperature of the water in said zone compartments, a flanged spirally trending member extending through said heat zones and surrounding the recessed end portion of the tank, a rotary carrier extending longitudinally through the spirally trending member and the heat zones and provided with parallel longitudinally extending bars of angular form in cross section and between which the cans are maintained and slide in moving through the heat zones, end portions of said bars extending closely around the recessed portion of the discharge end of the tank and being formed to permit the cans to pass therebetween when in register with the peripheral discharge opening, said rotary carrier having transverse partitions which coact with the tank partitions for preserving the heat zones, means for feeding cans to the inlet opening, means for removing cans from the discharge opening, and means for forcing defective cans through the discharge opening which would not otherwise pass therethrough.

10. A continuous cooker, comprising a horizontally extending tank having a side inlet adjacent one end and a rounded recessed opposite end provided with an outlet opening in its upper peripheral portion, said tank also having transverse partitions for dividing the tank into water compartment zones of various degrees of heat, water and discharge supply pipes connected to the different zone compartments, steam inlet pipe means for controlling the temperature of the water in said zone compartments, a flanged spirally trending member extending through said heat zones and surrounding the recessed end portion of the tank, a rotary carrier extending longitudinally through the spirally trending member and the heat zones and provided with parallel longitudinally extending bars of angular form in cross section and between which the cans are maintained and slide in moving through the heat zones, end portions of said bars extending closely around the recessed portion of the discharge end of the tank and being formed to permit the cans to pass therebetween when in register with the peripheral discharge opening, said rotary carrier having transverse partitions which coact with the tank partitions for preserving the heat zones, means for feeding cans to the inlet opening, means for removing cans from the discharge opening and means for forcing defective cans through the discharge opening which would not otherwise pass therethrough.

11. A continuous cooker, comprising a horizontally extending tank having a side inlet adjacent one end and a rounded recessed opposite end provided with an outlet opening in its upper peripheral portion, said tank also having transverse partitions for dividing the tank into water compartment zones of various degrees of heat, means for controlling the temperature of the water in said zone compartments, a flanged spirally trending member extending through said heat zones and surrounding the recessed end portion of the tank, a rotary carrier extending longitudinally through the spirally trending member and the heat zones and provided with parallel longitudinally extending bars of angular form in cross section and between which the cans are maintained and slide in moving through the heat zones, end portions of said bars extending closely around the recessed portion of the discharge end of the tank and being formed to permit the cans to pass therebetween when in register with the peripheral discharge opening, said rotary carrier having transverse partitions which coact with the tank partitions for preserving the heat zones, means for feeding cans to the inlet opening, means for receiving cans from the discharge opening and diverting them in a certain direction, means for forcing out defective cans which do not pass through the discharge opening, and means for receiving the defective cans and diverting them in a different direction.

12. A continuous cooker, comprising a tank member having an inlet opening adjacent one end and a recessed opposite end provided with an outlet opening, means for moving cans through the tank from the inlet opening to the outlet opening, means for receiving said cans from the outlet opening, and other means for forcing defective cans from the tank which do not pass through the mentioned outlet opening.

13. A continuous cooker, comprising a tank member having an inlet opening adjacent one end and a recessed opposite end provided with an outlet opening, said tank also having a plurality of compartments forming heating zones, means for moving cans through the heating zones and dropping them through the discharge opening, and means for positively forcing defective cans from said tank which do not drop through the discharge opening.

14. A continuous cooker, comprising a horizontally extending tank having inlet and outlet openings and zones of various degrees of heat, means controlling the temperature of said zones, a spirally tending member extending through said heat zones, a rotary carrier extending through the spirally trending member and coacting therewith for moving cans from the inlet opening through the heat zones and to the outlet opening and having means for preserving the heat zones, and means for positively forcing defective cans through a portion of the discharge opening which would not otherwise drop through said opening.

15. A continuous cooker, comprising a horizontally extending tank having an inlet opening adjacent one end and a recessed opposite end provided with an outlet opening, said tank also having zones of various degrees of heat, means for controlling the temperature of said zones, a spirally trending member extending through said heat zones and surrounding the recessed end of the tank, a rotary carrier extending through the spirally trending member and the heat zones and having discharge portions which extend around the recessed end of the tank, said rotary carrier coacting with the spirally trending member in moving cans from the inlet opening through the heat zones and to the recessed end outlet opening, said rotary carrier having means coacting with the tank heat zones for preserving the heat zones, and a reciprocating member for positively forcing defective cans through a portion of the discharge opening which would not otherwise drop through said opening.

16. A continuous cooker, comprising a horizontally extending tank having inlet and outlet openings, means for moving cans from the inlet opening through the tank and to the outlet opening, means for directing discharged perfect cans to a predetermined point, and means for diverting defective cans to a different point.

17. A continuous cooker, comprising a horizontal tank having an upper rounded portion and inlet and outlet openings, transverse partitions dividing the tank into a plurality of zone compartments of various degrees of heat, a spirally trending member extending through the tank and the heat zones, and adjacent the upper rounded portion of the tank, a rotary carrier extending coaxially through the spirally trending member and coacting therewith, means for feeding cans to the inlet opening, and means for diverting imperfect cans from the other cans.

18. A continuous cooker, comprising a horizontal tank having heating zones of different degrees of heat and also having inlet and outlet openings, a spirally trending member within the tank and extending through said zones, and a rotary carrier extending through the spirally trending member and coacting therewith in moving cans from the inlet to the outlet opening, said rotary member permitting cans to drop through a portion of the carrier while revolving to pass through the outlet opening.

19. An automatic cooker, comprising a horizontal tank of comparatively considerable depth having a plurality of heating zones of different degrees of heat, a single means for moving cans of food through said tank at a constant speed and in the same continuous path, said can moving means also carrying partitions for maintaining predetermined temperatures in the different compartments, and means controlling the temperature of the heat zones to vary the degree of cooking of different kinds of food in the cans.

20. An automatic cooker, comprising a horizontal tank having a plurality of water compartments of comparatively considerable depth for holding water at different temperatures, a single means moving at a constant speed for moving cans of food through the water from one compartment to the other and in the same continuous path, said can moving means also carrying partitions for maintaining predetermined temperatures in the different compartments, and means controlling the temperature of the water in the different compartments to vary the degree of cooking of different kinds of food in the cans.

In testimony whereof I affix my signature.

FRANK D. CHAPMAN.